(12) United States Patent
Groeger

(10) Patent No.: US 6,496,381 B1
(45) Date of Patent: Dec. 17, 2002

(54) CONTACT ARRANGEMENT AND COUNTER-CONTACT MODULE

(75) Inventor: Klaus-Erwin Groeger, Diekholzen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/743,824

(22) PCT Filed: May 10, 2000

(86) PCT No.: PCT/DE00/01460
§ 371 (c)(1),
(2), (4) Date: Mar. 14, 2001

(87) PCT Pub. No.: WO00/70553
PCT Pub. Date: Nov. 23, 2000

(30) Foreign Application Priority Data

May 14, 1999 (DE) .......................................... 199 22 064
Sep. 9, 1999 (DE) .......................................... 199 43 060

(51) Int. Cl.[7] ................................................. H05K 1/18
(52) U.S. Cl. ....................... 361/761; 361/789; 361/800; 361/743; 439/59; 439/946; 439/948
(58) Field of Search ................................. 361/761, 737, 361/796, 752, 726, 727, 789, 800, 802, 743, 753; 439/946, 948, 954, 59

(56) References Cited

U.S. PATENT DOCUMENTS 6,106,317 A * 8/2000 Michaelis et al. .......... 439/326

FOREIGN PATENT DOCUMENTS

| EP | 0775964 | 5/1997 |
| FR | 2634095 | 1/1990 |
| JP | 61080482 | 4/1986 |

* cited by examiner

Primary Examiner—Randy W. Gibson
Assistant Examiner—Hung Bui
(74) Attorney, Agent, or Firm—Kenyon & Kenyon

(57) ABSTRACT

A contact arrangement for an electrically contactable module that is arranged on a card-shaped carrier, having a first contact bank with a plurality of contact areas, of which at least one is disposed outside of a predefined region. A second contact bank is provided having at least one contact area within the predefined region, and the contact areas of the first contact bank that are arranged outside of the predefined region are in each case electrically connected to contact areas of the second contact bank.

Consequently, for example, both chip cards according to ISO 7816 and multimedia card modules can be evaluated by a chip-card reader provided for evaluating ISO-7816 chip cards. At the same time, the ability of the MMC modules to be evaluated by an MMC-module reader provided for that purpose is retained.

14 Claims, 4 Drawing Sheets

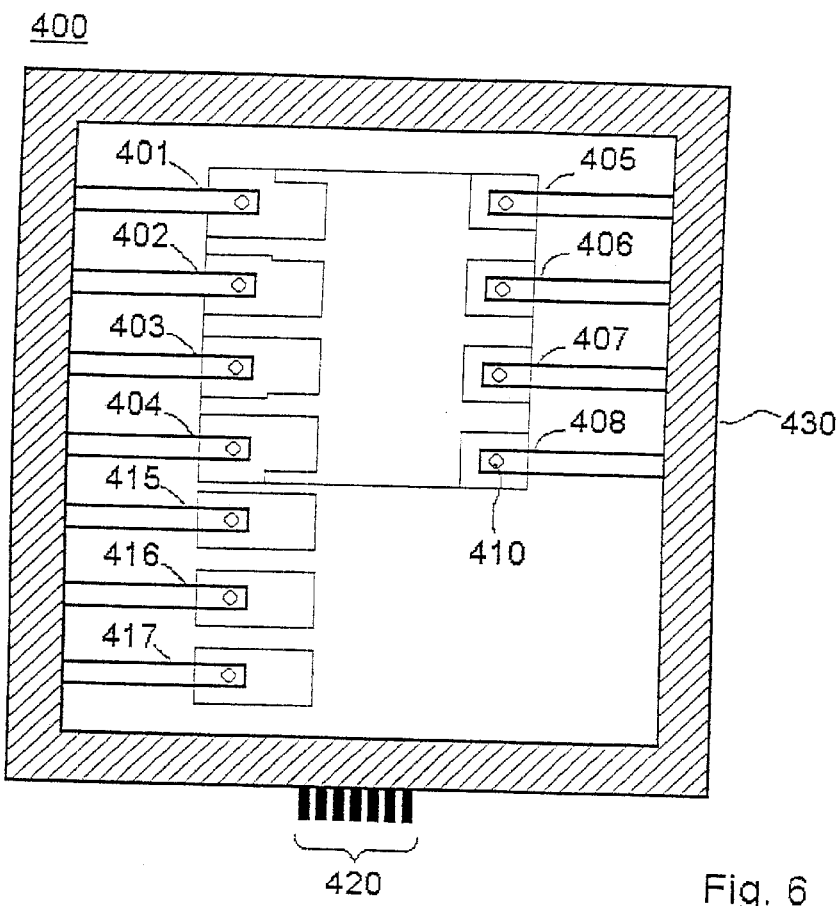
Fig. 6
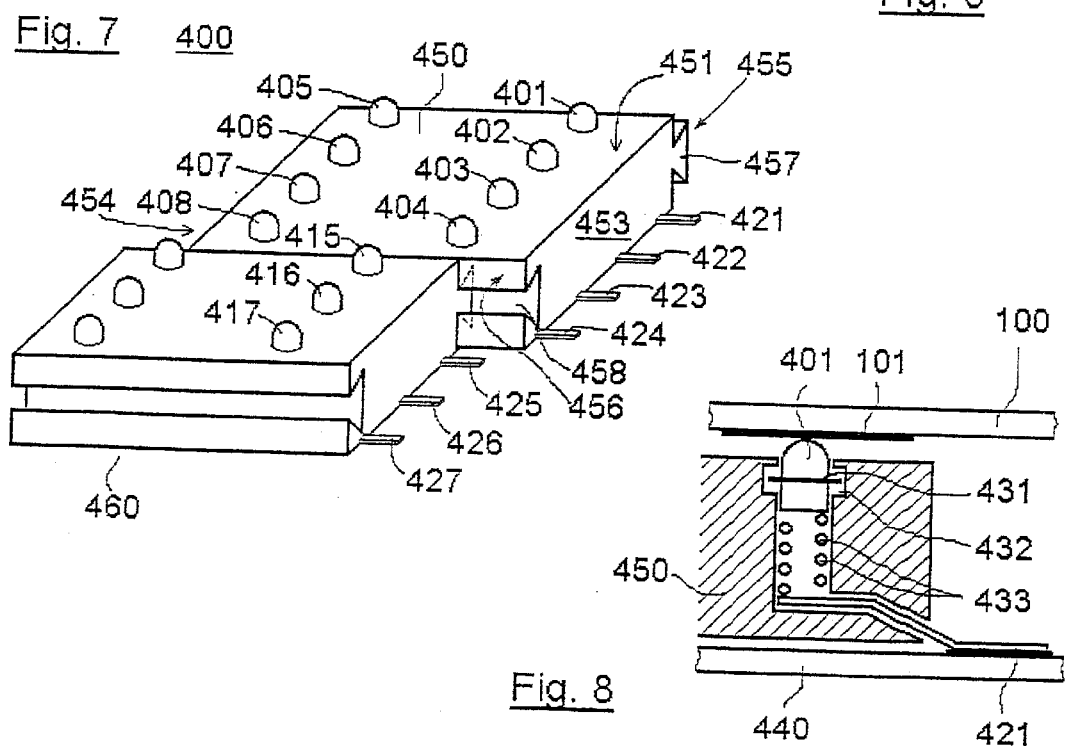
Fig. 7
Fig. 8

CONTACT ARRANGEMENT AND COUNTER-CONTACT MODULE

FIELD OF THE INVENTION

The present invention is related to a contact arrangement for an electrically contactable module that is arranged on a card-shaped carrier and has a contact bank including contact areas, as well as a counter-contact module.

BACKGROUND INFORMATION

Electrically contactable modules arranged on cardshaped carriers have been known for a long time in the form of so-called chip cards, e.g. as phone cards, Eurocheque cards, health insurance cards, or even as so-called key cards for car radios from the firm Blaupunkt-Werke GmbH. They are essentially made of at least one microchip, embedded into a plastic card of predefined dimensions, which can be designed as a memory chip and/or microprocessor chip. In the case of chip cards in accordance with the ISO (International Organization for Standardization) standard 7816-1 and following, standards the contacts of a microchip embedded in the card are connected to contact areas arranged on the top surface of the card. Thus, with the aid of counter contacts provided in a suitable chip-card reader, the module embedded in the plastic card can be contacted for the purpose of reading out its information, i.e. for the exchange of information between the module and the chip-card reader.

In the meantime, further chip cards, deviating from the ISO 7816-1 standard and following, have become known, e.g. in the form of the multi-media-card (MMC) of the Siemens firm. These differ from those according to ISO 7816-1 and following„due to their arrangement of the contact areas which is different from the contact arrangement stipulated in ISO 7816-2.

Furthermore, counter-contact modules for use in chip-card readers are known which, because of their arrangement of the counter contacts, are suitable for the evaluation of chip cards according to the ISO 7816 standard.

SUMMARY OF THE INVENTION

The present invention relates to a contact arrangement for an electrically contactable module, arranged on a card-shaped carrier, having a first contact bank with a plurality of contact areas of which at least one is disposed outside of a predefined region. According to the present invention, the contact arrangement has the distinctions that a second contact bank having at least one contact area is provided within a predefined region, and that contact areas of the first contact bank which are arranged outside of the predefined region are in each case electrically connected to contact areas of the second contact bank.

The contact arrangement of the present invention has the advantage that even those electrically contactable modules whose contact arrangement differs from a predefined contact-area arrangement are easily adaptable to the predefined contact-area arrangement. Thus, such modules of standard evaluation units which are adjusted to the predefined contact-area arrangement are contactable, as well.

In particular, the present invention allows, for example, the contacting and evaluation of or communication with the indicated multi-media card by a chip-card reader provided for chip cards according to the standard ISO 7816-1 and following standards.

In addition, the present invention renders possible the contacting of the indicated multi-media card both with an ISO 7816 chip-card reader and with a chip-card reader provided for multi-media cards, since the present invention permits the adaptation of the contact areas of the MMC card to the ISO 7816 standard, while retaining the MMC contact-area arrangement.

A counter-contact module according to the present invention is advantageously designed for contacting a contact arrangement of the present invention, using a corresponding arrangement of the module's counter contacts.

Such a counter-contact module can easily be produced from a conventional counter-contact module for contacting, for example, ISO7816 contact arrangements, by stringing on a further counter-contact submodule. A dovetailed groove recessed into a side wall of the counter-contact submodule, as well as a dovetailed tongue premolded onto a corresponding opposite side wall of the further counter-contact submodule to be added on represent an advantageous construction of means for cascading the counter-contact submodules. Locating pins which are premolded on a side wall of the counter-contact submodule, thus, of an ISO 7816 counter-contact module, for example, and which engage with locating bore holes in an opposite side wall of the counter-contact submodule to be added on, represent further advantageous stringing means. They permit precise alignment of the top surfaces of the submodules, so that they are in alignment with each other, and the counter contacts lie in a plane parallel to the top surface. At least one locking hook which is arranged on the top side and/or the bottom side of the counter-contact submodule, and which engages with at least one corresponding recess in the top side and/or bottom side of an attached further counter-contact submodule makes it possible to fix in position and stabilize a counter-contact module composed of counter-contact submodules, and thus the position of the contact rows and contact clearances relative to each other.

Means arranged on the top side of a counter-contact submodule, e.g. in the form of detent hooks, in conjunction with detents for the latchtype assembly of counter-contact elements, permit easy retrofit capability of individual counter-contact elements, accompanied at the same time by reliable and positionally accurate fixation of the counter-contact elements utilized.

BRIEF DESCRIPTION OF THE DRAWINGS

FIG. 6 shows a counter-contact module according to an embodiment of the present invention which is suitable for use in a chip-card reader for the alternative evaluation of chip cards having different contact banks.

FIG. 7 shows a further exemplary embodiment of a counter-contact module composed of two submodules.

FIG. 8 shows an intersection through a submodule of the counter-contact module according to the further exemplary embodiment.

DETAILED DESCRIPTION

Chipcards along the lines of the ISO standard 7816 belong to the group of identification cards as they are defined in the standard ISO 7810 "Identification Cards—Physical Characteristics". This standard specifies the physical characteristics of identification cards, including the material properties such as flexibility, temperature stability and dimensions for three different sizes of cards (ID-1, ID-2 and ID-3). The ID-1 card, as is in wide-spread use today as a card for payment transactions such as the credit card and Eurocheque card, forms the basis for the chip-card standards ISO 7816-1 and following standards.

Such a chip card includes in the card body an integrated circuit provided with elements for data transmission, storage of data and processing of data. In this context, the data can be transmitted either via the contacts at the top surface of the card, or else in a contactless manner through electromagnetic fields.

The essential characteristics and functions of chip cards are stipulated in the ISO Standards of Series 7816.

Figure 1:
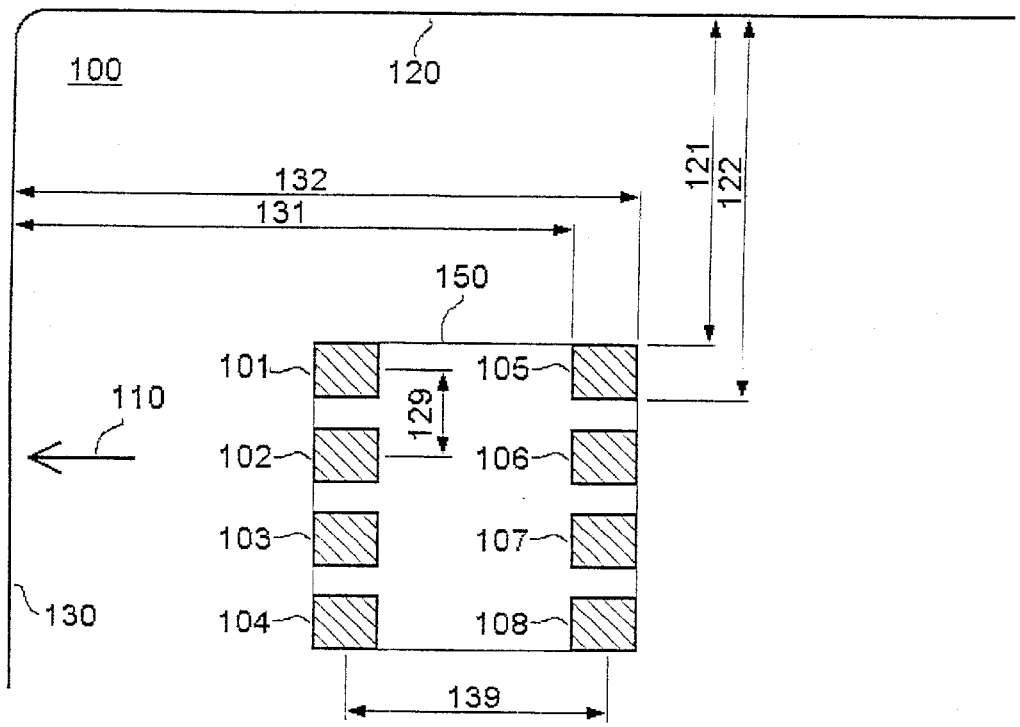
FIG. 1 shows the contact bank, i.e. the contact areas of a chip card in accordance with ISO 7816-1 and following standards.

FIG. 1 shows a plan-view cut-away portion of a chip card 100 in accordance with ISO 7816.

The chip card is provided with a front edge 130, based on insertion direction 110, and a right edge 120, designated in ISO 7816 as upper edge, the position of contact areas 101, 102, 103, 104, 105, 106, 107 and 108, which are arranged on the top side of the chip card in a manner that they are accessible from the outside, being indicated in ISO 7816-2 relative to edges 120 and 130.

ISO 7816-2 specifies minimum dimensions of 1.7 mm×2.0 mm for contact areas 101 through 108. Distances 131, specified in the following table, of contact areas 101 through 108 from the front edge, and distances 121 of the contact areas from the top edge represent the maximum measure, and distances 132 from the front edge and 122 from the top edge represent the minimum measure.

| Contact Area | Distance 131 from front edge [mm], max | Distance 132 from front edge [mm], min | Distance 121 from right edge [mm], max | Distance 122 from right edge [mm], min |
|---|---|---|---|---|
| 101 | 10.25 | 12.25 | 19.23 | 20.93 |
| 102 | 10.25 | 12.25 | 21.77 | 23.47 |
| 103 | 10.25 | 12.25 | 24.31 | 26.01 |
| 104 | 10.25 | 12.25 | 26.85 | 28.55 |
| 105 | 17.87 | 19.87 | 19.23 | 20.93 |
| 106 | 17.87 | 19.87 | 21.77 | 23.47 |
| 107 | 17.87 | 19.87 | 24.31 | 26.01 |
| 108 | 17.87 | 19.87 | 26.85 | 28.55 |

Maximum measure for the contact areas are not defined by ISO 7816-2; however, it must be ensured that contact areas 101 through 108 are electrically insulated from one another. As can easily be seen, maximum distances 131 of contact areas 101 through 104 and minimum distances 132 of contact areas 105 through 108 from the front edge of the chip card, as well as maximum distances 121 of contact areas 101 and 105 and minimum distances 122 of contact areas 104 and 108 from the top edge of chip card 100 define a rectangular region 150 of 9.62 mm×9.32 mm, which, according to ISO 7816, is taken up by contact areas 101 through 108. In connection with the present invention, region 150 is also designated as predefined region. ISO 7816-2 permits the contact areas to jut outwardly beyond the predefined region.

Two adjacent contact rows 101 through 104 and 105 through 108, predefined in accordance with ISO 7816-2, have a center-to-center distance 139 of 7.62 mm in insertion direction 110; center-to-center distance 129 of two adjacent contact areas 101 and 102 transverse to insertion direction 110 is 2.54 mm.

Figure 2:
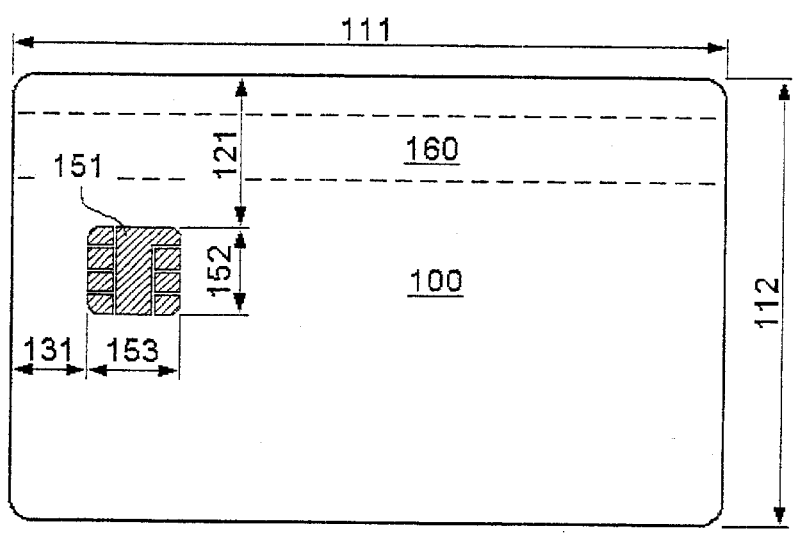
FIG. 2 shows an ISO 7816 chip card having a typically formed contact bank, using a Eurocheque card as an example.

The Eurocheque card, shown in FIG. 2, whose contact bank 151, composed of contacts 101 through 108, has an area of approximately 11.7 mm (153) in the insertion direction and approximately 10.5 mm (152) transverse to the insertion direction, represents a concrete exemplary embodiment of the above-described ISO 7816 chip card. Distances 131 of contact areas 101 through 104 to the front edge and 121 of contact areas 101 and 105 to the top edge are roughly 9.0 mm and 18.5 mm.

The outside dimensions of the depicted Eurocheque card in the ID-1 format, which includes a magnetic strip 160 as an additional storage medium on its back side, are approximately 85.5 mm (111) in the insertion direction and approximately 54.0 mm (112) transversely thereto.

Figure 3:
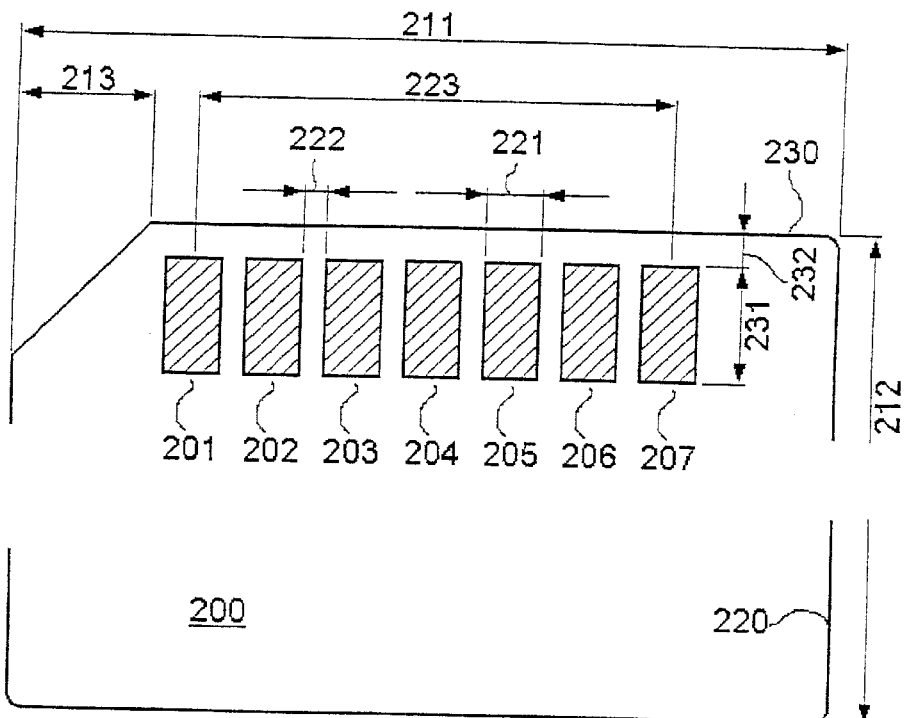
FIG. 3 shows a multi-media card having a contact-area arrangement which was measured on an actually existing specimen.

A multi-media card 200, MMC for short, of the firm Siemens shown in FIG. 3 represents a chip card deviating from the 7816 standard. As in the case of a standard chip card, the chip carrier, together with the actual chip, is formed as one unit on whose top surface the contact areas are arranged for contacting the chip. The chip carrier, as in the case of a standard chip card as well, is glued in place in a corresponding recess in card 200 in such a way that the top surface of the chip carrier terminates flush with that of MMC card 200, and the contact areas are on the top side of the card.

The card has outer dimensions of roughly 24 mm (211)× 32 mm (212), the upper left corner shown in the plan view being tapered by 4.0 mm×450°. The contact bank of the MMC card, designated in the following as first contact bank, is designed in the form of a first contact row, having contact areas 201, 202, 203, 204, 205, 206 and 207, which has a distance 231 of 1.0 mm to the narrow front side 230 of the chip card. Contact areas 201 through 207 themselves have dimensions of 1.7 mm (221)×3.5 mm (231), and have a distance of 0.625 mm among one another transversely to broad side 220 of the MMC card.

Figures 4, 5:
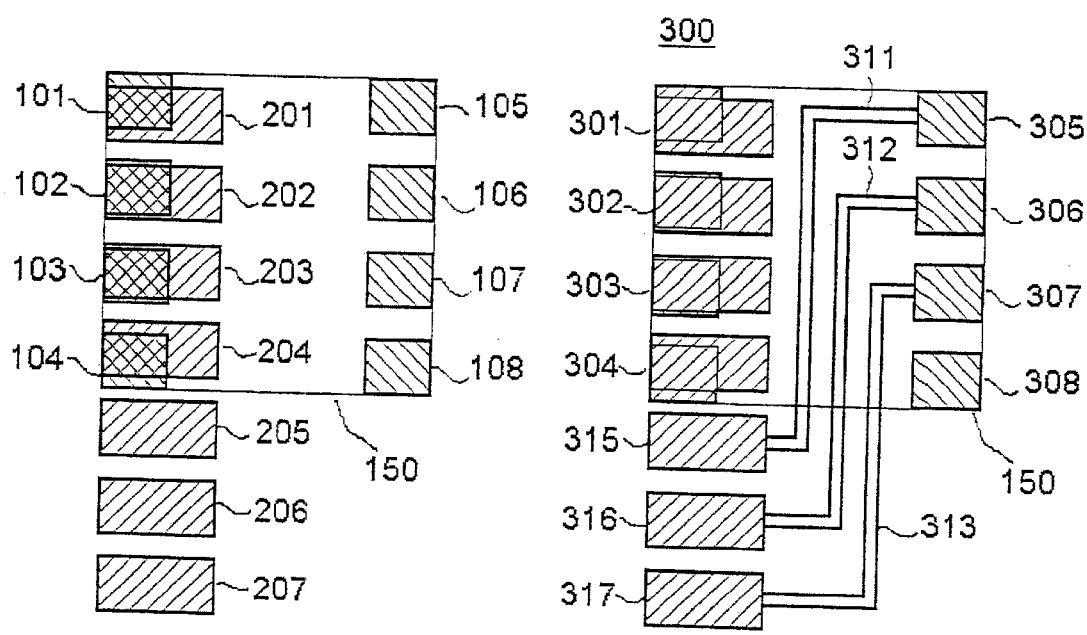
FIG. 4 shows a projection of the contact areas of an ISO 7816 chip card and a multimedia card one upon the other.
FIG. 5 shows a contact arrangement according to an embodiment of the present invention which meets both the ISO 7816 standard and the MMC standard according to FIG. 3, determined by measuring, and thus is contactable both with an MMC reader and an ISO 7816 chip-card reader.

As can easily be seen from FIG. 4 showing the projection of the contact banks of a chip card in accordance with ISO 7816 and those of the MMC card one upon the other, both the contact areas 101 through 108 of the ISO 7816 chip card and contact areas 201 through 204 of the MMC card lie within the dimensions of predefined region 150. It may be that contacts 201 through 204 of =the MMC card do not meet the requirements of the ISO 7816-2 standard, however, they can be adapted to the ISO 7816-2 standard by slight broadenings.

Thus, an overlapping of first contact bank 201 through 207 of the MMC card and of second contact bank 101 through 108 of the ISO 7816 chip card exists in the region of contact areas 201 through 204 of the MMC card and 101 through 104 of the ISO chip card.

Further contact areas 205 through 207 of the MMC card lie outside of predefined region 150.

To now provide the possibility of being able to evaluate an MMC card both with an MMC card reader and with a chip-card reader for chip cards according to the ISO 7816 standard, it is proposed to arrange within predefined region 150 on the MMC card, a second contact row 105 through 108 adjacent to first contact row 201 through 207 in such a way that contact areas 201 through 204 of the MMC card can be adapted to the ISO 7816 standard by slight broadenings, and contact areas 105 through 108 of the second contact row satisfy the requirements of the ISO 7816 standard.

FIG. 5 shows an appropriate contact arrangement according to the present invention, implemented, for example, on an MMC card.

The contact arrangement of FIG. 5 includes a first contact bank having contacts 301 through 304 which result from an overlapping of contact areas 101 through 104 in accordance with ISO 7816-2 and 201 through 204 of the MMC card, and which, in the area of region 150 predefined by ISO 7816-2, meet both the requirements of ISO 7816-2 and the requirements of MMC-card contact areas. Also provided is a second contact bank having contact areas 305 through 308 which likewise satisfies the requirements of ISO 7816-2 with respect to their position. Contact areas 205, 206 and 207 of the MMC card which lie outside of predefined region 150 are taken over unchanged (contact areas 315, 316 and 317), and thus continue to allow the evaluation of the MMC card by an MMC card reader. To simultaneously provide the ability of the MMC card, modified in such a manner, to be evaluated by an ISO card reader, contact areas 315 through 317 lying outside of predefined region 150 are connected to contact areas 305, 306, 307 or 308 of the second contact bank via printed circuit traces 311, 312, 313. Thus, all contacts of the MMC module are contactable using MMC contact areas and ISO 7816-2-compatible contact areas alike.

The printed circuit traces are run along the top surface of chip card 200, i.e. of the chip carrier.

The above-described exemplary embodiment relates to a modified contact arrangement for MMC modules. However, it is also equally conceivable to, for example, provide the contact arrangement, described above and depicted in FIG. 5, on a chip card in accordance with ISO 7816. Thus, an ISO-7816 chip-card is also evaluable both for ISO-7816 chip-card readers and for MMC card readers.

Furthermore, the present invention is also not restricted to producing compatibility between the ISO 7816 standard and MMC. Rather, by suitable arrangement of a second contact bank within a region predefined by a standard such as ISO 7816, the present invention permits adaptation of various contact arrangements to the standard. In this context, at most a restriction results due to different contact quantities, thus, for example, when the contact arrangement to be adapted has more allocated contacts than the contact arrangement according to the standard.

Against the background of a contact arrangement 300 according to the present invention which is adapted for alternative evaluation by an ISO 7816 chip-card reader or an MMC chip-card reader, FIG. 6 shows, by way of example, a counter-contact module 400 having counter contacts 401 through 408 and 415 through 417.

In this context, a separate counter contact 401, 402, 403, 404, 405, 406, 407 and 408 of counter-contact module 400 is allocated to each contact area 301 through 308 of the ISO 7816 contact bank. Counter-contact module 400 is also provided with further contacts 415, 416 and 417 which are allocated to contact areas 315, 316 and 317 of the MMC contact bank.

The same features as on contact arrangement 300 of the present invention are applicable with respect to the alignment of the counter contacts relative to each other.

Counter contacts 401 through 408 and 415 through 417 are in the form of metallic flat springs which, on their bottom sides facing the contact areas, have contact beads 410 for contacting contact areas 301 through 308 and 315 through 317.

The counter contacts are secured in a carrier, in the present case, in a frame-shaped plastic carrier 430. In addition, printed circuit traces which produce an electrical connection between the counter contacts and an attachment plug are run in frame-shaped plastic carrier 430.

Thus, the counter-contact module described is suitable for use in a chip-card reader for the alternative evaluation of chip cards having different contact banks, for example, of ISO-7816 chip cards, just as of MMC chip cards. Adaptation to further contact banks is possible by an appropriate adjustment of the arrangement of the counter contacts within the counter-contact module, as well as the number of counter contacts contained in the module.

A further advantageous exemplary embodiment of a counter-contact module according to the present invention is depicted in FIGS. 7 and 8. In this case, counter contact module 400 is made of submodules 450 and 460 which can be strung together. Submodules 450 and 460 have essentially cuboidal bodies with a top side 451 and lateral surfaces 453, 454, 455 and 456. Projecting from top side 451 of first submodule 450 are two counter contact rows having counter contacts 401 through 408 for contacting the contact surfaces of an ISO-7816 chip card, whose arrangement relative to each other satisfies the requirements of ISO 7816 for that purpose. Counter contacts 401 through 404 are joined to soldered connections 421, 422, 423, 424 which are brought out from side wall 453 standing parallel to first counter-contact row 401 through 404. In the same way, counter contacts 405 through 408 of second counter-contact row 405 through 408 are joined to a second row of soldered connections, not shown in the Figure, which are brought out from second side wall 454 opposite first side wall 453.

Like first submodule 450, second submodule 460 has counter contacts 415, 416 and 417 for contacting further contact areas 205, 206 and 207 of an MMC module or 315, 316 and 317 of a contact arrangement of an ISO-7816 chip card adapted to the MMC format. As in the case of the first submodule, they are likewise joined to connections 425, 426 and 427 brought out from first lateral surface 453 of the counter-contact-module body.

A third side wall 455 and a fourth side wall 456 of the cuboidal counter-contact-module body have means for the side-by-side arrangement of counter-contact modules, e.g. for supplementing first counter-contact module 450 by a second counter-contact module 460 to form a counter-contact module 400 for contacting both ISO-7816 chip cards and MMC cards. In the present exemplary embodiment, these means are in the form of a dovetailed groove 458 milled out of fourth side wall 456 of first submodule 450, and a dovetailed tongue 457 premolded on third side wall 455 of second submodule 460, so that the two submodules can be strung together by inserting dovetailed tongue 457 of second submodule 460 into dovetailed groove 458 of first submodule 450. To add on further submodules, in the present exemplary embodiment, the first submodule has a further dovetailed tongue 457 on its third lateral surface, and second submodule 460 has a further dovetailed groove 458 on its fourth lateral surface 456. The measurements of the submodule bodies, particularly the position of counter contacts 401 through 408 and 415 through 417 relative to the third and fourth lateral surfaces, are dimensioned such that a counter-contact module 400 formed from second submodule 460 added to fourth lateral surface 456 of first submodule 450 is suitable for contacting both ISO-7816 contact arrangements and MMC contact arrangements; in particular, the contact distances stipulated by the ISO 7816 and the MMC standard are observed.

FIG. 8 shows an intersection through first counter contact submodule 450. Like remaining counter contacts 402 through 408, as well as counter contacts 415 through 417 of second submodule 460, counter contact 401 is in the form of a flexibly supported pin. For largely wear-free and damage-free contacting of a corresponding contact area 101 or 301, the tip of counter contact 401 is rounded off or, as in the present case, is in the form of a hemisphere. Premolded around the shaft of pin-shaped counter contact 401 is a rim 431 which is guided in a groove 432 of the counter-contact-module body. The arrangement of rim 431 and groove 432 permits movement of the pin in a direction perpendicular to module top side 451, and at the same time prevents counter-contact pin 401 from falling out of counter-contact module 450. To ensure reliable contacting of contact area 101 or 301 of a chip card 100 located over counter-contact module 450, counter-contact pin 401 is pushed by a metallic spiral spring 433 in the direction of top side 451 of counter-contact module 450. In this context, the maximum deflection of pin 401 is limited by the upper cover of groove 432. Soldered connection 421 brought out from the counter-contact-module body forms the lower abutment of spiral spring 433.

In FIG. 8, counter-contact module 450 is shown by way of example as an SMD (surface mounted device) component for solder-mounting on the top surface of a printed-circuit board 440. Of course, other designs are also theoretically possible, e.g., using a plug-in connection 420.

The counter-contact arrangement for contacting a contact arrangement according to the present invention, an ISO-7816 or an MMC contact arrangement can also be implemented in the form of a contact holder which is able to be freely fitted with counter contacts depending on the need. For example, it could be designed in the form of the body of counter-contact module 450 which is able to be fitted as needed with solder connections 421 through 427 and counter contacts 401 through 408 and 415 through 417.

Figure 9:
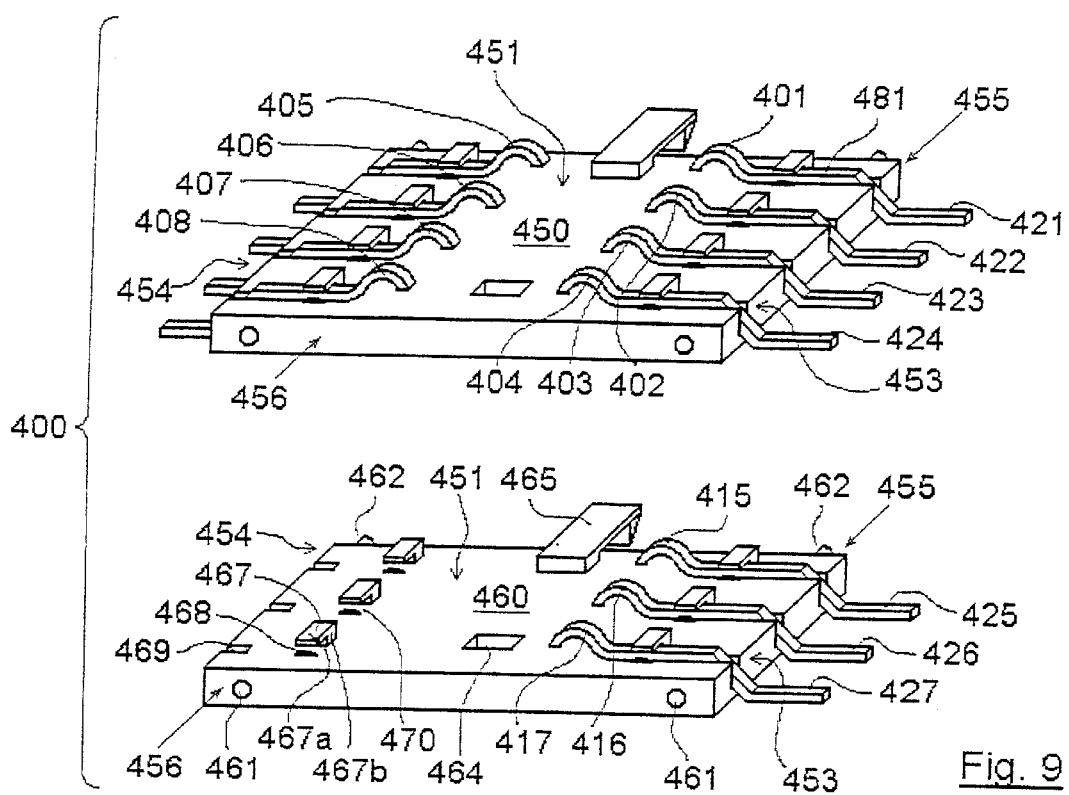
FIG. 9 shows a third exemplary embodiment for a counter-contact module which can likewise be composed of two submodules.

A third exemplary embodiment of a counter-contact module 400 of the present invention for contacting both ISO-7816 chip cards and MMC cards is shown in FIG. 9.

The counter-contact module is made of two cuboidal, strung-together submodules 450 and 460 which are constructed in an essentially identical manner and differ merely in the number of counter contacts 401 through 408 and 415 through 417, or of the counter contacts which can be arranged on the module body.

For the side-by-side arrangement of submodules 450 and 460, they have on their third and fourth lateral surfaces, which are perpendicular to the contact rows and first and second side walls 453 and 454, attachment means in the form of bore holes 461 on third side wall 453 and locating pins 462 on fourth side wall 454. Locating pins 462, in conjunction with locating bore holes 461 for accommodating the locating pins, produce mutual alignment of submodules 450 and 460 when they are arranged side-by-side, so that top surfaces 451, as well as the first and second lateral surfaces of submodules 450 and 460 are in alignment with each other, thus, in each case form a common surface. The means for the side-by-side arrangement of the submodules also include means for interlocking cascaded submodules 450 and 460 among themselves. In each case, these means are constructed in the form of a locking hook 465, arranged on top side 451 of submodules 450 and 460, which projects above the body of the respective submodule in the direction of its third lateral surface 455 and which, when the submodules are arranged side-by-side and are aligned relative to each other perpendicular to first and second side walls 453 and 454, locks into a recess 464 in top surface 451 of respective adjacent submodule 460. In this manner, the two adjacent submodules 450 and 460 are interlocked relatively to each other by interlocking means 464 and 465. Thus, the distances of contacts 415 and 404 are fixed relative to each other.

The submodules, at their top edges along first and second lateral surfaces 453 and 454, have recesses 469 for receiving counter-contact elements 481. Also arranged on the top side of the submodules are means 467, 468 for the latching-type mounting of counter-contact elements 481. These means are constructed in the form of angular detent hooks 467, a first leg 467a of the detent hook, which is disposed essentially parallel to top side 451 of submodule 450, 460, guiding counter-contact element 481 in a direction perpendicular to top surface 451 of the submodule, while a second leg 467b of detent hook 467 connects first leg 467a to the top side of the module body and produces a lateral guidance of counter-contact element 481 along first and second lateral surfaces 453 and 454 of the submodule. The mounting means also include a detent 468 which is disposed on top surface 451 of the module body, immediately next to detent hook 467 on its open side. The detent effects a guidance of counter-contact element 481 in the opposite direction to second leg 467b of detent hook 467. The detent is arranged either at the bottom side of the first leg of detent hook 468 or, as in the present exemplary embodiment, on top surface 451 of the module body. Thus, detent hook 467 and detent 468 form a channel 470 in which a counter-contact element 481 can be inserted in a latching manner. The height of the detent is preferably low with respect to the height, predefined by the thickness of counter-contact element 181, of second leg 467b of detent hook 467, so that by bending detent hook 467 up slightly, a counter-contact element can be inserted across the detent into the opening of the detent hook. At the same time, the height of detent 468 is selected to be sufficiently great to prevent counter-contact element 481 from unintentionally sliding out from the detent hook.

Counter-contact elements 481 are in the form of bent, metallic spring-type strips made of material with good electroconductive ability. In the region of the contact areas of the module to be contacted, they have a semicircular arching which is used as counter contact 401. Toward the edge of module body 450, the spring-type strips are bent downward, thus toward bottom surface 452 of the module body, and change there into connections 421, in the present case for the SMC printed-circuit board mounting.

The module body can also be designed without detent means 467, 468 for counter-contact elements 481, and is then merely used, for example, as a positioning aid during the mounting of counter-contact elements 481 in accordance with the stipulations appropriately applicable for the contact arrangement of the present invention, and for supporting counter-contact elements 481 against a pressure force exerted on counter contacts 401 by a chip card or MMC card to be evaluated.

What is claimed is:

1. A contact arrangement for an electrically contactable module that is situated on a card shaped carrier, comprising:
   - a first contact bank including a plurality of first contact areas, at least one of the first contact areas being situated outside a predefined region; and
   - a second contact bank including at least one second contact area situated within the predefined region;
   - region wherein there are at least as many second contact areas situated within the predefined region as there are first contact areas situated outside the predefined region, and each first contact area situated outside of the predefined region is electrically connected to one of the second contact areas situated within the predefined region.

2. The contact arrangement of claim 1, wherein the predefined region is a region specified by standard ISO 7816-1 for contact areas of a contact bank.

3. The contact arrangement of claim 1, wherein:
   - the first contact bank includes:
     - a first contact row, the first contact row having first contact areas adjacent to one another, a number of the first contact areas in the first contact row being within the predefined region: and
   - the second contact bank includes:
     - a second contact row adjacent to the first contact row, the second contact row being situated in the predefined region.

4. The contact arrangement of claim 1, wherein the electrically contactable module is at least one of a processor module and a storage module.

5. The contact arrangement of claim 1, wherein the electrically contactable module is an MMC module.

6. A counter-contact module, comprising:
   - a plurality of counter contacts for contacting an electrically contactable module situated on a cardshaped carrier, the plurality of counter contacts contacting a plurality of first contact areas in a first contact bank, at least one of the first contact areas being situated outside a predefined region, the plurality of counter contacts further contacting a least one second contact area in a second contact bank, the at least one second contact area being situated within the predefined region;
   - wherein there are at least as many second contact areas situated within the predefined region as there are first contact areas situated outside the predefined region, and each first contact area situated outside the predefined region is electrically connected to one of the second contact areas situated within the predefined region.

7. The counter-contact module of claim 6, further comprising submodules, the submodules including at least one counter contact.

8. The counter-contact module of claim 7, wherein the submodules include joining elements, the joining elements mounting in a latchtype manner.

9. The counter contact module of claim 6, wherein each of the counter contacts includes a solder connection for a printed-circuit-board mounting.

10. A counter-contact submodule for forming a counter contact module, the counter contact module including a plurality of counter contacts for contacting an electrically contactable module situated on a cardshaped carrier, the plurality of counter contacts contacting a plurality of first contact areas in a first contact bank, at least one of the first contact areas being situated outside of a predefined region, the plurality of counter contacts further contacting at least one second contact area in a second contact bank, the at least one second contact area being situated within the predefined region, each of the at least one first contact area situated outside of the predefined region being electrically connected to at least one of the at least one second contact area, the submodule comprising:
    - joining elements for joining at least one further counter-contact submodule to the counter-contact submodule.

11. The counter-contact submodule of claim 10, further comprising:
    - walls, including a third wall and a fourth wall;
    - a dovetailed tongue situated on the third wall; and
    - a dovetailed groove situated on the fourth wall;
    - wherein the dovetailed tongue and the dovetailed groove are adapted to engage dovetailed grooves and tongues, respectively, of further counter-contact submodules.

12. The counter-contact submodule of claim 10, further comprising:
    - walls, including a third wall and a fourth wall;
    - at least one locating pin situated on the third wall; and
    - at least one bore hole situated on the fourth wall;
    - wherein the at least one locating pin and the at least one bore hole are adapted to engage at least one bore hole and at least one locating pin, respectively, of further counter-contact submodules.

13. The counter-contact submodule of claim 10, further comprising:
    - interlocking elements, the interlocking elements mutually interlocking with interlocking elements of a further counter-contact submodule when the counter-contact submodule and the further counter-contact submodule are mounted in a side-by-side manner.

14. The counter-contact submodule of claim 13, further comprising:
    - a top side;
    - a bottom side, the interlocking elements including:
      - a locking hook situated on at least one of the top side and the bottom side; and
      - a recess situated on at least one of the top side and the bottom side;
    - wherein the locking hook and the recess are adapted to engage a recess and a locking hook, respectively, of further counter-contact submodules.

* * * * *